United States Patent [19]
Hoff et al.

[11] Patent Number: 6,066,394
[45] Date of Patent: *May 23, 2000

[54] PLASTICIZER RESISTANT EMULSION ACRYLIC PRESSURE SENSITIVE ADHESIVE

[75] Inventors: Susanne Marie Hoff, Manchester, Conn.; Leo Ternorutsky, East Longmeadow, Mass.

[73] Assignee: Solutia Inc., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/827,857

[22] Filed: Apr. 9, 1997

[51] Int. Cl.$^7$ ........................................ C09J 7/02
[52] U.S. Cl. ..................................... 428/355 AC
[58] Field of Search .............................. 428/343, 355 AC

[56] References Cited

U.S. PATENT DOCUMENTS

| | | | |
|---|---|---|---|
| 3,284,423 | 11/1966 | Knapp | 260/80.5 |
| 3,903,057 | 9/1975 | Gardner et al. | 260/78.5 T |
| 4,438,177 | 3/1984 | Potter . | |
| 4,605,592 | 8/1986 | Paquette . | |
| 4,970,193 | 11/1990 | Liang . | |
| 5,194,486 | 3/1993 | Levine et al. | 524/556 |
| 5,196,504 | 3/1993 | Scholz et al. | 526/318.4 |
| 5,229,207 | 7/1993 | Paquette . | |
| 5,357,031 | 10/1994 | Miess et al. | 528/337 |
| 5,550,181 | 8/1996 | Scholz | 524/460 |
| 5,604,034 | 2/1997 | Matsuda . | |
| 5,620,796 | 4/1997 | Kawabata . | |
| 5,622,783 | 4/1997 | Huizer . | |
| 5,741,153 | 4/1998 | Winslow et al. | 427/208.4 |
| 5,741,543 | 4/1998 | Winslow . | |

FOREIGN PATENT DOCUMENTS

| | | |
|---|---|---|
| 5316664 | 6/1966 | Australia . |
| 9314161 | 7/1993 | WIPO . |
| 9626221 | 8/1996 | WIPO . |
| 9727261 | 7/1997 | WIPO . |

OTHER PUBLICATIONS

Abstract: WO 9727261A (19970731) discloses pressure sensitive adhesive comprising an aqueous dispersion of a copolymer of acrylic esters made in the presence of methacrylic anhydride as crosslinking monomer carrying a functional group, the copolymer having a glass transition temperature Tg which does not exceed 0 deg. C.

*Primary Examiner*—Jenna Davis
*Attorney, Agent, or Firm*—Gordon F. Sieckmann; Thompson Coburn LLP

[57] ABSTRACT

A plasticized polyvinylchloride (PVC) substrate coated with a plasticizer-resistant pressure-sensitive adhesive comprising a plasticized PVC substrate on which is deposited an adhesive acrylic PSA polymerized in the presence of a chain transfer agent, comprising about 50 to about 99.8% $C_1$–$C_{12}$ alkyl acrylate monomer, 0 to about 40% vinyl unsaturated monomer, 0.1 to about 10% carboxylic acid functionalized monomer, 0 to about 10% hydroxyl functionalized monomer and about 0.1 to about 10% internal crosslinking monomer wherein the PSA has a glass transition temperature, $T_g$, of less than −10° C. and greater than about −45° C. and wherein said substrate retains at least 40% peel adhesion and 50% shear strength after heat aging.

9 Claims, No Drawings

6,066,394

PLASTICIZER RESISTANT EMULSION ACRYLIC PRESSURE SENSITIVE ADHESIVE

BACKGROUND OF THE INVENTION

This invention relates to pressure sensitive acrylic adhesives (PSAs) for coating onto plasticized plastic substrates (such as PVC substrates) by deposition thereon and to such pressure sensitive products made therefrom which exhibit a good balance of both good peel and sheer retention after heat aging. More in particular, this invention relates to a plasticized polymer (such as polyvinyl chloride) substrate coated with a pressure sensitive adhesive deposited thereon.

Illustratively one pressure sensitive adhesive product is a bandage. PSAs are used in bandages to make a bandage stick to the skin of a patient. The PSA is adhered to a suitable medically acceptable substrate and medication applied to the substrate on which has been deposited the PSA.

PSAs are also used with plasticized polymer substrates such as polyvinyl chloride. Polyvinyl chloride ("PVC") is a commercially available linear polymer which is rigid to a certain degree. PVC may be employed in the form of foam and function as insulation for walls, roofs, and other uses usually when the PVC has been plasticized. In this way, the PVC is made softer and more flexible through the addition of plasticizers (such as phthalic esters, phosphoric esters, esters of adipic, azelac acid and sebacic acid, fatty acid esters, epoxidized fatty acid esters, citric esters, esters of acetic, propionic and butyric acids, esters of ethyl, butyric and ethyl hexanoic acid, glycolic esters, polymeric polyester plasticizers chlorinated hydrocarbons, such as chloroparaffins, benzoic esters such as diglycol benzoate, dibenzytoluene, trimetallic esters, alkyl sulfonic esters, sulfonamides such as toluene sulfonamide and abietic esters) and PVC is then acceptable as a flexible plasticized foam. The PSA is used to adhere the plasticized PVC foam to another surface. PVC films also contain plasticizer and are used in applications such as labels, decals, signs, wallpaper, etc.

While the plasticizers impart desired softness and increased flexibility to the normally rigid PVC as in plasticized PVC foam and film, the plasticizer can have an adverse effect on a PSA which has been deposited onto plasticized PVC. This adverse impact occurs during aging such as heat aging as the PSA may have its adhesion, cohesive strength or "stick" properties undesirably reduced.

In some instances, PSAs are employed with plasticized PVC sound-deadening foam in order to enable the PVC to stick to another surface quieting sound. For example, a PSA may be employed with foamed PVC (containing plasticizer) to enable the foamed PVC to adhere to a metal surface such as in a sound deadening automobile applications or gaskets.

Until this invention, the deterioration of such "stick" properties with aging had remained a persistent problem with PSA-applied plasticized PVC foam products in that the plasticized PVC foam products lose adhesion from the surface where they have been attached or that PVC plasticized tape loses its peel adhesion and shear strength properties when stored for long periods of time rendering the tape ineffective for later use.

OBJECTS OF THE INVENTION

A principal object of this invention is to provide a plasticizer resistant PSA which retains a high percent of both peel adhesion and shear strength after heat aging.

Another object of this invention is to provide an adhesive acrylic PSA having superior peel adhesion and shear strength retention after heat aging.

Yet another object of this invention is to provide a water-based pressure sensitive adhesive tailored for use on plasticized PVC substrates which has a high peel adhesion and shear strength respectively after heat aging.

Other objects of this invention will become apparent from the following detailed description and claims.

BRIEF SUMMARY OF THE INVENTION

These and other objects are accomplished in this invention by providing a plasticized (PVC) substrate coated with a plasticizer-resistant pressure-sensitive adhesive comprising a plasticized PVC substrate on which is deposited an adhesive acrylic PSA comprising about 50 to about 99.8% $C_1$–$C_{12}$ alkyl acrylate monomer, 0 to about 40% vinyl unsaturated monomer, 0.1 to about 10% carboxylic acid functionalized monomer, 0 to about 10% hydroxyl functional monomer, about 0.1 to about 10% internal crosslinking monomer wherein the PSA polymer has a glass transition temperature, $T_g$, of less than –10° C. and greater than –45° C. and wherein the substrate retains at least 40% peel adhesion and 50% shear strength after heat aging.

BRIEF DESCRIPTION OF THE SEVERAL VIEWS OF THE DRAWING (NOT APPLICABLE)

DETAILED DESCRIPTION OF THE INVENTION

This invention comprises a plasticized polyvinylchloride (PVC) substrate coated with a plasticizer-resistant pressure-sensitive adhesive comprising a plasticized PVC substrate on which is deposited an adhesive acrylic PSA polymerized in the presence of a chain transfer agent, comprising about 50 to about 99.8% $C_1$–$C_{12}$ alkyl acrylate monomer, 0 to about 40% vinyl unsaturated monomer, 0.1 to about 10% carboxylic acid functionalized monomer, 0 to about 10% hydroxyl functionalized monomer and about 0.1 to about 10% internal crosslinking monomer wherein the PSA polymer has a $T_g$ of less than about –10° C. and greater than about –45° C. and wherein the substrate retains at least 40% peel adhesion and 50% shear strength after heat aging.

A preferred temperature-resistant pressure-sensitive composition comprises about 70 to about 99.3% $C_1$–$C_{12}$ alkyl acrylate monomer, 0 to about 20% vinyl unsaturated monomer preferably vinyl acetate, 0.5 to 5% carboxylic acid functionalized monomer, preferably acrylic acid, and 0.1 to 5% of a hydroxyl functional monomer, and about 0.1 to about 5% internal crosslinking monomer wherein the PSA polymer has a $T_g$ of less than –10° C. and greater than –45° C., wherein the substrate retains at least 40% peel adhesion and 50% shear strength after heat aging.

This invention employs an effective amount of chain transfer agent (CTA) and an internal crosslinkable monomer during polymerization of the monomers recited above in forming the pressure sensitive acrylic resin of the PSA. In a preferred embodiment, an effective amount of CTA is used to reduce the gel content of the PSA film to less than about 70% by weight. In general this requires a CTA concentration of more than 0 and up to about 2% by weight, preferably about 0.05 to about 0.5% based on the weight of polymer solids.

Any suitable CTA (including CTA mixtures) can be used which is soluble in the monomers of the acrylic polymer or the water of the emulsion. Usable CTAs include alkylmercaptans such as n-dodecyl mercaptan or t-dodecyl mercaptan, mixtures thereof and the like. N-dodecyl mercaptan is a preferred CTA.

Alkyl acrylate monomers usable in this invention are those which preferably have a glass transition temperature between −10 and −60° C. and comprise one or more alkyl acrylate monomers such as alkyl acrylate monomers containing $C_1$–$C_{12}$ alkyl groups, e.g., butyl acrylate, 2-ethyl hexyl acrylate, isooctylacrylate, mixtures thereof and the like. Also usable are isomeric acrylates such as tertbutyl acrylate, isopropyl acrylate and isobutyl acrylate, mixtures thereof and the like. A preferred alkyl acrylate monomer usable in this invention is a mixture of butyl acrylate monomer and ethyl acrylate monomer.

Vinyl unsaturated monomers usable in this invention include vinyl unsaturated monomers such as vinyl acetate, vinyl propenoate, vinyl chloride, mixtures thereof and the like. A preferred vinyl unsaturated monomer usable in this invention is vinyl acetate.

Proton donating monomers are useful in this invention as it is believed without being bound by theory that they provide reactive hydrogen atoms and sites for subsequent crosslinking with crosslinking monomers. Typical proton donating monomers include carboxylic acid functionalized monomers and hydroxyl functionalized monomers. A mixture of carboxylic acid functionalized monomers and hydroxyl functionalized monomers is preferred in this invention.

Suitable carboxylic acid functionalized monomers include but are not limited to acrylic acid, methacrylic acid, fumaric acid, itaconic acid, mixtures thereof and the like. Acrylic acid is a preferred carboxylic acid functionalized monomer useful in this invention.

Suitable hydroxyl functionalized monomers include but are not limited to 2-hydroxyethyl acrylate, 3-hydroxyethyl methacrylate, 3-hydroxypropyl acrylate and 3-hydroxypropyl, methacrylate, mixtures thereof and the like. 2-hydroxyethylacetate is a preferred hydroxylic functionalized monomer useful in this invention.

Among internal crosslinking monomers useful herein are cyclic ether monomers such as allyl glycidyl ether, glycidyl methacrylate, mixtures thereof and the like. Without being bound by theory, it is believed that these monomers crosslink with proton donating monomers described above. In preferred embodiments the molar ratio of proton donating monomer to internal crosslinker can range from about 1:1 to about 20:1, although greater or lesser effective molar ratios can be employed if desired. Allyl glycidyl ether is a preferred crosslinking monomer useful in this invention.

Without being bound by theory, it is believed that the chain transfer agent lowers the gel content of the PSA film, allowing better film coalescence. In this way, it is believed that there is less penetration of the plasticizer from the PVC into the PSA giving the film good plasticizer resistance. It is also believed that the internal crosslinking monomer imparts to the film good shear strength and peel retention due to limited diffusibility of the plasticizer into the crosslinked film. Together, these characteristics enable the PSA coated substrate to have excellent peel adhesion and shear strength retention on heat aging.

The novel acrylic pressure-sensitive polymers of this invention may be prepared by conventional emulsion polymerization techniques using water-soluble or oil-soluble free radical initiator systems or with redox initiator systems in the presence of effective amounts and concentrations of ionic and non-ionic surfactants. The amount of surfactant is an effective amount typically sufficient to provide an average size of 0.1 to 0.8 microns to the emulsion particles and is usually from about 1 to about 5% of the aqueous emulsion. The concentration of polymer in the aqueous latex emulsion is an effective and sufficient concentration such as between about 30 to about 70, preferably about 40 to about 65% by weight to provide adequate viscosity for ease of coating and sufficient solids content for economy.

The chain transfer agent and the crosslinking monomer are both preferably present during the polymerization step in forming the pressure sensitive adhesive. Effective amounts are employed. A preferred chain transfer agent is n-dodecyl mercaptan. A preferred crosslinking monomer is allyl glycidyl ether.

Latex emulsions containing the modified acrylic interpolymers of the invention may also contain conventional additives such as foam suppressants, thickeners, plasticizers and the like.

In preparing the plasticized polyvinylchloride (PVC) substrate of this invention, pressure-sensitive adhesive acrylic (PSA) prepared in accordance with this specification can be cast or otherwise suitably deposited on a plasticized PVC foam substrate and the cast or deposited films then dried at room temperature for a suitable time perhaps of the order of about 15 minutes or so and then at a suitable temperature perhaps of the order of about 70° C. for a suitable time of perhaps about 5 minutes to provide dried films on substrate. Those of skill in the art will recognize that various types of different plasticized polymer substrates which adversely affect PSA performance can be employed in this invention such as polypropylene, polyamide (including nylon), polystyrene, polyethylene, polyester and ABS (acrylonitrile-butadiene-styrene copolymer).

The following specific Examples illustrate this invention. All parts and percentages are by weight throughout this specification and Examples unless otherwise indicated.

EXAMPLES

Example 1

Test Procedure

Samples were prepared and properties reported in these Examples measured according to the following procedures.

1. Preparation of Coated PVC Substrate. Pressure-sensitive adhesive (PSA) resin emulsions were cast on plasticized PVC foam substrates and the cast films dried at room temperature for 15 minutes and then at 70° C. for 5 minutes. The dried films (2.5 to 3.0 mil thick) were cooled over 15 minutes to 22° C. and laminated to silicone-release paper. This layered structure was conditioned for 24 hours at 22° C., 50% relative humidity.

2. PSA 180° Angle Dynamic Peel. The coated substrate of 1. above was cut into one-inch (2.5 cm) test strips, 6 in. (15.2 cm) long and reinforced with 1 in. wide polyester backing tape applied to the uncoated side of the PVC foam. The release paper was removed and the test strips applied to a stainless steel plate (2 strips per plate) using an automated 4.5 lb. (2.0 Kg) Pressure Sensitive Tape Council ("PSTC") rolldown apparatus, once in both directions. A bond dwell time of 20 minutes was allowed before peeling. Average peel strength in lbs/inch was determined on an Instron Test Machine by peeling a strip from a plate at a 180° angle at a rate of 12 in. (30.5 cm) per minute.

3. Shear Strength. Samples were prepared as noted in 1. above and 1 in. squares were cut from the coated substrate.

The squares were attached to a glass slide using a double-sided mounting tape from 3M applied on the back, uncoated face of the PVC foam substrate. The side with the 1 in. square section of adhesive was applied to the vertical face of a flat stainless steel panel using the automated rolldown apparatus referred to in 2. above. After the double pass, a dwell period of 30 minutes was allowed and then a static load of 1 Kg (2.2 lb) was attached to the lower end of the glass slide and allowed to hang at 22° C., 50% relative humidity until bond failure. The time (in hours) to failure was noted.

4. Peel Adhesion After Heat Aging. Coated PVC substrate samples were pared as in 1. The samples were aged at 70° C. for 7 days; conditioned 24 hours at 22° C., 50% relative humidity and then tested according to 2.

5. Shear Strength After Heat Aging. Samples were aged as in 4. and then tested according to 3.

6. Gel Content. The emulsion sample was cast onto a silicone-release paper and the cast films were dried at room temperature for 1 hour and then at 90° C. for 5 minutes. Another piece of release paper was placed over the adhesive film and the film was dried in a desiccator. Approximately 0.7 to 0.8 g of the adhesive film was peeled from the release paper and placed between two pieces of porous (0.45 μm pore size, 47 mm diameter) polytetrafluoroethylene membranes. The edges of the membranes were heat sealed and then placed in a jar containing methyl ethyl ketone (MEK) and shaken for 24 hours. The MEK was decanted, replaced with fresh MEK and shaken for another 24 hours. The sample was vacuum dried for another 12 hours and the weight of undissolved gel was measured and reported as the percentage of the original weight.

The following Examples are exemplary of the invention wherein all parts and percentages are by weight unless otherwise indicated. Examples C-1 through C-3 are controls not according to the invention. C-1, C-2 and C-3 are designations for Examples.

Example C-1

This control example showed the adverse effect of plasticizer in the PVC in lowering the peel adhesion and shear strength properties of the adhesive resin.

A. The ingredients in Table II below (Column C-1) were added at ambient temperature to a tank equipped with a high-speed agitator and stirred until a viscous gel was formed.

B. The ingredients in Table III were charged to a two-liter stirred polymerization reactor, followed by 5% of the mixture of A. The contents of the polymerization reactor were heated to 78° C., whereupon the balance of A. was charged continuously at a constant flow rate over 195 minutes. During this addition, the temperature increased to 82° C. and was held at this temperature. After addition of A. was complete, the reactor contents were held at 82° C. for an additional 30 minutes, followed by cooling to 55° C. Then 0.39 g of Trigonox A-W70® from AKZO Nobel, 1 Livingston Avenue, Dobbs Ferry, N.Y. 12522-3401 (i.e., 70% water solution of tertbutylhydroperoxide) and 0.3 g of Parolite® from Henkel Corporation, 300 Brookside Avenue, Ambler, Pa. 19002 (i.e., zinc sulfoxylate formaldehyde) were then charged and the contents held for 30 minutes at 55° C., followed by cooling to room temperature. Polymer adhesive resin composition was shown in Table I.

C. Coated PVC substrates were prepared as noted above and peel adhesion and shear strength before and after heat aging measured. Results are summarized in Table IV. Peel adhesion and shear strength before heat aging are 1.8 lb./in. and 500 hours, respectively; whereas after heat aging, these had dropped to 0.55 lb./in. and 0.1 hour. This corresponds to a peel adhesion retention of 30.5% (0.55/1.8×100) and a shear strength retention of only 0.02%.

Examples C-2, C-3

These control resins were prepared in a similar manner as in C-1 above. Formulations were identified in Tables II and III and test results in Table IV. Peel retention in C-2 was 93.1% but shear retention was only 6.7%. For C-3, peel retention is 53.3% while shear retention is only 8.3%. The reduction in acrylic acid content in C-3 resulted in desirable higher peel adhesion but its shear strength was correspondingly lowered.

Example 1

This Example illustrates this invention. The adhesive resin was prepared according to Example C-1 and samples were tested as noted above. The test results are summarized in Table IV. Peel retention of Example 1 is 69.1% and shear retention is 64.7%. This combination of peel and shear strength retention is significantly improved over those of C-1, C-2 and C-3.

Examples 2,3

These Examples illustrate this invention. Polymer procedural preparation and testing as described in C-1 is repeated using formulations shown in Tables I and II. Desirable peel and shear retention values (Table IV) are obtained as in Example 1.

The Table IV data shows that the control examples do not retain more than 10% of shear strength after heat aging on PVC foam. The use of a chain transfer agent, e.g., n-dodecylmercaptan, in C-2 and C-3 does increase peel adhesion retention but fails to significantly improve shear strength adhesion. The observed increase in peel adhesion can be correlated to a decrease in gel content for C-2, C-3, and 1-3 relative to Example C-1 (Table I). This decrease in gel content is believed due to the use of a chain transfer agent. High retention of both shear strength and peel adhesion occurred unexpectedly with polymers synthesized in the presence of both chain transfer agent and crosslinking monomer (e.g., allyl glycidyl ether, AGE). For example, shear strength actually increased after heat aging in Example 2 (147% retention). Invention Examples 1–3 provide orders of magnitude increase in shear strength retention. Peel adhesion retention in Examples 1–3 using resin synthesized in the presence of both chain transfer agent and crosslinking monomer was comparable to that of C1–C3.

TABLE I

| | % By Weight | | | | | | | | |
|---|---|---|---|---|---|---|---|---|---|
| # | BA | EA | VAC | AA | HEA | AGE | DDM | % Polymer | % Gel Content |
| C-1 | 25.99 | 65.55 | 1.52 | 5.94 | 0 | 1.00 | 0 | 100 | 78 |
| C-2 | 26.99 | 65.55 | 1.52 | 5.94 | 0 | 0 | 0.02 | 100 | 69 |
| C-3 | 31.94 | 65.54 | 1.52 | 1.00 | 0 | 0 | 0.02 | 100 | 32 |
| 1 | 31.80 | 65.25 | 1.51 | 1.00 | 0 | 0.44 | 0.02 | 100 | 61 |
| 2 | 31.66 | 64.96 | 1.5 | 1.00 | 0 | 0.88 | 0.02 | 100 | 57 |
| 3 | 31.42 | 65.38 | 1.51 | 1.00 | 0.25 | 0.44 | 0.02 | 100 | 52 |

TABLE II

|  | Grams | | | | | |
| --- | --- | --- | --- | --- | --- | --- |
|  | C-1 | C-2 | C-3 | 1 | 2 | 3 |
| Water | 149.8 | 149.8 | 149.8 | 149.8 | 149.8 | 149.8 |
| Surfactant A[1] | 28.6 | 28.6 | 28.6 | 28.6 | 28.6 | 28.6 |
| Surfactant B[2] | 2.9 | 2.9 | 2.9 | 2.9 | 2.9 | 2.9 |
| Acrylic acid (AA) | 33.3 | 33.3 | 5.6 | 5.6 | 5.6 | 5.6 |
| 2-Hydroxyethyl acrylate (HEA) | 0 | 0 | 0 | 0 | 0 | 1.40 |
| Vinyl acetate (VAC) | 8.5 | 8.5 | 8.5 | 8.5 | 8.5 | 8.5 |
| Ethyl acrylate (EA) | 367.4 | 367.5 | 367.5 | 367.5 | 367.5 | 367.5 |
| Butyl acrylate (BA) | 145.7 | 151.3 | 179.1 | 179.1 | 179.1 | 176.6 |
| Allyl glycidyl ether (AGE) | 5.60 | 0 | 0 | 2.50 | 5.00 | 2.50 |
| n-Dodecyl mercaptan (DDM) | 0 | 0.20 | 0.20 | 0.20 | 0.20 | 0.20 |

[1]30% water solution; Abex EP-120 ® anionic surfactant from Rhone-Poulenc, North American Chemicas, Surfactants and specialities, CN 7500, Cranberry, NJ, 08512-7500,
[2]70% water solution; Aerosol OT ® anionic surfactant from Cytec Industries, Inc., Foot of Trembley Point Road, P.O. Box 31, Linden, NJ, 07036-0031

TABLE III

| Material | Grams |
| --- | --- |
| Water | 240 |
| Surfactant A | 0.43 |
| Sodium bicarbonate | 1.4 |
| Potassium persulfate | 2.9 |

TABLE IV

| | INITIAL | | AFTER HEAT AGING | | | |
| --- | --- | --- | --- | --- | --- | --- |
| # | Peel Adhesion (lb./in.) | Shear Strength (hrs.) | Peel Adhesion (lb./in.) | % Peel Adhesion Retention | Shear Strength (hrs.) | % Shear Strength Retention |
| C-1 | 1.8(A)[1] | 500(C)[2] | 0.55(A) | 30.5 | 0.1(C) | 0.02 |
| C-2 | 2.9(A) | 42(C) | 2.7(A) | 93.1 | 2.8(C) | 6.7 |
| C-3 | 7.5(C) | 2.4(C) | 4.0(C) | 53.3 | 0.2(C) | 8.3 |
| 1 | 5.5(C) | 1.7(C) | 3.8(C/A) | 69.1 | 1.1(C) | 64.7 |
| 2 | 5.5(C) | 1.5(C) | 2.5(A) | 45.5 | 2.2(C) | 147 |
| 3 | 5.9(C) | 1.8(C) | 3.5(C) | 59.3 | 1.7(C) | 94.4 |

[1]A = adhesive failure mode
[2]C = cohesive failure mode

While the invention has been described with respect to various specific examples and embodiments thereof, it is understood that the invention is not limited thereto and many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A plasticized polyvinylchloride substrate coated with a pressure-sensitive adhesive polymer (PSA) comprising about 50 to about 99.8% $C_1$–$C_{12}$ alkyl acrylate monomer, 0 to about 40% vinyl unsaturated monomer, 0.1 to about 10% carboxylic acid functionalized monomer, 0 to about 10% hydroxyl functionalized monomer and about 0.1 to about 10% cyclic ether monomer selected from allyl glycidyl ether, glycidyl methacrylate and mixtures thereof, wherein the PSA has a $T_g$ of less than $-10°$ C. and greater than about $-45°$ C. and wherein said substrate has a value of Peel Adhesion After Heat Aging which is at least 40% of the value of PSA 180% Angle Dynamic Peel determined before heat aging and a value of Shear Strength After Heat Aging which is at least 50% of the value of Shear Strength determined before heat aging.

2. The plasticized polyvinylchloride (PVC) substrate of claim 1 coated with a plasticizer-resistant pressure sensitive adhesive acrylic PSA wherein said alkyl acrylate is present from about 70% to about 99.8%.

3. The adhesive acrylic PSA of claim 2 wherein said carboxylic acid functionalized monomer is acrylic acid and wherein said hydroxyl functionalized monomer is 2-hydroxyethyl acrylate.

4. The adhesive acrylic PSA of claim 3 wherein said alkyl acrylate is $C_1$–$C_4$ alkyl acrylate.

5. The adhesive acrylic PSA of claim 4 wherein said alkyl acrylate is a mixture of ethyl acrylate and butyl acrylate.

6. The adhesive acrylic PSA of claim 5 wherein said internal crosslinkable monomer is allyl glycidyl ether and said $C_1$–$C_4$ acrylate is a mixture of ethyl acrylate and butyl acrylate.

7. A substrate according to claim 1 wherein said PSA is polymerized in the presence of a chain transfer agent.

8. A plasticized polyvinylchloride substrate coated with a pressure-sensitive adhesive (PSA) comprising about 70 to about 99.3% $C_1$–$C_{12}$ alkyl acrylate monomer, 0 to about 20% vinyl acetate, 0.5 to 5% carboxylic acid functionalized monomer, 0.1 to 5% hydroxyl functionalized monomer, and about 0.1 to about 5% cyclic ether monomer selected from allyl glycidyl ether, glycidyl methacrylate and mixtures thereof, wherein said PSA has a $T_g$ (glass transition temperature) of less than $-10°$ C. and greater than about $-45°$ C. and wherein said substrate has a value of Peel Adhesion After Heat Aging which is at least 40% of the value of PSA 180° Angle Dynamic Peel determined before heat aging and a value of Shear Strength After Heat Aging which is at least 50% of the value of Shear Strength determined before heat aging.

9. A substrate according to claim 8 wherein said PSA is polymerized in the presence of a chain transfer agent.

* * * * *